United States Patent
Yoshino et al.

(10) Patent No.: US 12,158,736 B2
(45) Date of Patent: Dec. 3, 2024

(54) ELECTRONIC APPARATUS ACTIVATION CONTROL APPARATUS, ELECTRONIC APPARATUS ACTIVATION CONTROL SYSTEM, ELECTRONIC APPARATUS ACTIVATION CONTROL METHOD, AND PROGRAM

(71) Applicant: Saturn Licensing LLC, New York, NY (US)

(72) Inventors: Masaharu Yoshino, Tokyo (JP); Takehiko Ueda, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/553,371

(22) Filed: Aug. 28, 2019

(65) Prior Publication Data

US 2019/0384241 A1    Dec. 19, 2019

Related U.S. Application Data

(63) Continuation of application No. 13/962,220, filed on Aug. 8, 2013, now abandoned.

(30) Foreign Application Priority Data

Aug. 22, 2012    (JP) .................................. 2012-183377

(51) Int. Cl.
G05B 15/02    (2006.01)
(52) U.S. Cl.
CPC ...... G05B 15/02 (2013.01); *G05B 2219/2642* (2013.01)

(58) Field of Classification Search
None
See application file for complete search history.

(56) References Cited

U.S. PATENT DOCUMENTS

2004/0092282 A1* 5/2004 Kim ............... H04L 12/2803
                                                      455/522
2005/0239518 A1* 10/2005 D'Agostino .......... G06F 1/3287
                                                      455/574

(Continued)

FOREIGN PATENT DOCUMENTS

CN    1973499 A    5/2007
CN    101136918 A    3/2008

(Continued)

OTHER PUBLICATIONS

Japanese Office Action for JP Application No. 2012183377, dated Nov. 17, 2015.

(Continued)

*Primary Examiner* — Charles E Anya
(74) *Attorney, Agent, or Firm* — Lerner David LLP

(57) ABSTRACT

An electronic apparatus activation control apparatus includes a communication unit and a data processing unit. The communication unit is configured to perform communication via a network. The data processing unit is configured to output an activation instruction to a network apparatus connected to the network through the communication unit. The data processing unit recognizes a state transition from a non-active state to an active state of the electronic apparatus activation control apparatus and outputs the activation instruction to the network apparatus on the basis of recognition of the state transition.

16 Claims, 10 Drawing Sheets

| Communication terminal identifier (ID) | Network apparatus (apparatus identifier (MAC address)) | | | | |
|---|---|---|---|---|---|
| | TV (1b2c15e7adff) | Air conditioner (345c1cdf134f) | PC (aa762cd38941) | BD recorder (fa256cdaa432) | ... |
| Communication terminal of user A (aaa111) | ○ | ○ | ○ | ○ | ... |
| Communication terminal of user B (bbb222) | ○ | × | × | × | ... |
| Communication terminal of user C (ccc333) | × | × | ○ | ○ | ... |

(56) References Cited

U.S. PATENT DOCUMENTS

| | | |
|---|---|---|
| 2006/0075269 A1 | 4/2006 | Liong et al. |
| 2006/0142879 A1 | 6/2006 | Chi |
| 2008/0028053 A1* | 1/2008 | Kelley .................... H04L 12/12 709/222 |
| 2008/0229091 A1 | 9/2008 | Abu-Akel |
| 2009/0125732 A1 | 5/2009 | Oya et al. |
| 2009/0299541 A1 | 12/2009 | Park et al. |
| 2009/0310607 A1* | 12/2009 | Evans ..................... H04L 12/12 370/389 |
| 2011/0090830 A1* | 4/2011 | Churei ............... H04N 1/00891 370/311 |
| 2011/0213472 A1 | 9/2011 | Clayton et al. |
| 2011/0264942 A1 | 10/2011 | Tsukamoto |
| 2012/0209991 A1 | 8/2012 | Handa |
| 2012/0315848 A1 | 12/2012 | Smith et al. |

FOREIGN PATENT DOCUMENTS

| | | |
|---|---|---|
| CN | 101401335 A | 4/2009 |
| CN | 201781588 U | 3/2011 |
| CN | 102549521 A | 7/2012 |
| JP | 2000270131 A | 9/2000 |
| JP | 2001045193 A | 2/2001 |
| JP | 2003244157 A | 8/2003 |
| JP | 2005223586 A | 8/2005 |
| JP | 2006001146 A | 1/2006 |
| JP | 2009239371 A | 10/2009 |
| JP | 2010186491 A | 8/2010 |
| JP | 2011191015 A | 9/2011 |

OTHER PUBLICATIONS

Chinese Office Action dated Apr. 1, 2017 for CN Application No. 201310355937.6.

* cited by examiner

| Communication terminal identifier (ID) | Network apparatus (apparatus identifier (MAC address)) | | | | |
|---|---|---|---|---|---|
| | TV (1b2c15e7adff) | Air conditioner (345c1cdf134f) | PC (aa762cd38941) | BD recorder (fa256cdaa432) | ... |
| Communication terminal of user A (aaa111) | ○ | ○ | ○ | ○ | ... |
| Communication terminal of user B (bbb222) | ○ | × | × | × | ... |
| Communication terminal of user C (ccc333) | × | × | ○ | ○ | ... |

FIG.9

ELECTRONIC APPARATUS ACTIVATION CONTROL APPARATUS, ELECTRONIC APPARATUS ACTIVATION CONTROL SYSTEM, ELECTRONIC APPARATUS ACTIVATION CONTROL METHOD, AND PROGRAM

CROSS REFERENCE TO RELATED APPLICATIONS

The present application is a continuation of U.S. patent application Ser. No. 13/962,220, filed on Aug. 8, 2013, now abandoned, which claims priority from Japanese Patent Application No. 2012-183377, filed on Aug. 22, 2012, the disclosures of which are hereby incorporated herein by reference.

BACKGROUND

The present disclosure relates to an electronic apparatus activation control apparatus, an electronic apparatus activation control system, an electronic apparatus activation control method, and a program. In particular, the present disclosure relates to an electronic apparatus activation control apparatus, an electronic apparatus activation control system, an electronic apparatus activation control method, and a program for controlling activation of electronic apparatuses connected to a network.

Today, various electronic apparatuses are used in homes and offices. For example, in a house, there are a large number of electronic apparatuses such as a TV, an air conditioner, a BD (Blu-ray (registered trademark) disk) recorder, and a PC, and those apparatuses are used.

In many cases, those electronic apparatuses are activated by inserting a power plug in a socket in a house and turning on a switch thereof to activate the apparatuses, and thus the apparatuses can be used.

However, some electronic apparatuses take time to be actually usable after being turned on. For example, in many cases, for apparatuses such as a PC and a BD recorder, after a user operates a switch of the apparatus to turn on the apparatus, an activation process for the apparatus is started. During the activation process, the user has to wait until the apparatus becomes usable.

Such a situation is inconvenient in the case where, for example, the user wants to use an electronic apparatus immediately after coming home.

To eliminate a standby time for the user, there is a measure that those apparatuses are always on, but this measure causes a problem of increasing power consumption.

As related art that discloses power control for an electronic apparatus, the followings have been proposed.

Japanese Patent Application Laid-open No. 2010-186491 (hereinafter, referred to as Patent Document 1) discloses the structure in which turning on and off of a plurality of PCs which are network-connected with a NAS (network attached storage) as a storage apparatus is performed in conjunction with an on and off operation of one PC.

However, in this method, it is necessary to turn on or off at least one of the PCs network-connected. As a result, when a user wants to use one PC, the user turns on the PC, and after that, activation of the PC is started. The user has to wait until the activation process of the PC is completed.

Japanese Patent Application Laid-open No. 2003-244157 (hereinafter, referred to as Patent Document 2) discloses a system capable of performing power control for a plurality of apparatuses with one apparatus by transmitting and receiving power activation packets among the plurality of network-connected apparatuses.

However, in this system, it is necessary for all the network-connected apparatuses to hold an apparatus list as packet transmission destinations. This structure is unsuitable to apparatuses having restrictions for a memory or the like.

Japanese Patent Application Laid-open No. 2010-186491 (hereinafter, referred to as Patent Document 3) discloses the structure in which a power supply of a fax machine connected to a PC is controlled in conjunction with an on and off state of a power supply of the PC, thereby reducing power consumption of the fax machine.

However, the structure is a control system based on the fact that the fax machine is not used when the PC is not used, and is not for power control among irrelevant apparatuses.

SUMMARY

In view of the above-mentioned circumstances, it is desirable to provide an electronic apparatus activation control apparatus, an electronic apparatus activation control system, an electronic apparatus activation control method, and a program for performing power control for various electronic apparatuses on the basis of a user operation and a state transition, thereby achieving lower power consumption and improvement of user's convenience.

According to an embodiment of the present disclosure, there is provided an electronic apparatus activation control apparatus including a communication unit configured to perform communication via a network and a data processing unit configured to output an activation instruction to a network apparatus connected to the network through the communication unit. The data processing unit recognizes a state transition from a non-active state to an active state of the electronic apparatus activation control apparatus and outputs the activation instruction to the network apparatus on the basis of recognition of the state transition.

Further, in the embodiment of the electronic apparatus activation control apparatus according to the present disclosure, the data processing unit periodically performs a state detection of the electronic apparatus activation control apparatus, and in the case where the electronic apparatus activation control apparatus maintains to be in the active state, periodically outputs the activation instruction to the network apparatus.

Further, in the embodiment of the electronic apparatus activation control apparatus according to the present disclosure, the data processing unit periodically performs a state detection of the electronic apparatus activation control apparatus, and when recognizing that the electronic apparatus activation control apparatus shifts from the active state to the non-active state, stops outputting of the activation instruction to the network apparatus.

Further, in the embodiment of the electronic apparatus activation control apparatus according to the present disclosure, in the state transition from the non-active state to the active state, the data processing unit determines one of an apparatus and a user that causes the state transition, selects the network apparatus to be activated on the basis of a determination result, and outputs the activation instruction for activating only the network apparatus selected.

Further, in the embodiment of the present disclosure, the electronic apparatus activation control apparatus is an illumination switch. In the electronic apparatus activation control apparatus, the data processing unit recognizes an operation of turning on the illumination switch by a user as the state transition from the non-active state to the active state of the electronic apparatus activation control apparatus and outputs the activation instruction to the network apparatus on the basis of the recognition of the state transition.

Further, in the embodiment of the present disclosure, the electronic apparatus activation control apparatus is an illumination switch. In the electronic apparatus activation control apparatus, the data processing unit recognizes an operation of turning off the illumination switch by a user as the state transition from the active state to the non-active state of the electronic apparatus activation control apparatus and stops outputting of the activation instruction to the network apparatus on the basis of the recognition of the state transition.

Further, in the embodiment of the present disclosure, the electronic apparatus activation control apparatus is an access point serving as a relay apparatus of a communication apparatus. In the electronic apparatus activation control apparatus, the data processing unit recognizes a detection of the communication apparatus that performs communication through the access point from a communication possible area as the state transition from the non-active state to the active state of the electronic apparatus activation control apparatus and outputs the activation instruction to the network apparatus on the basis of the recognition of the state transition.

Further, in the embodiment of the electronic apparatus activation control apparatus according to the present disclosure, the data processing unit identifies the communication apparatus, selects the network apparatus to be activated on the basis of an identification result, and outputs the activation instruction for activating only the network apparatus selected.

Further, in the embodiment of the present disclosure, the electronic apparatus activation control apparatus is an access point serving as a relay apparatus of a communication apparatus. In the electronic apparatus activation control apparatus, the data processing unit recognizes a non-detection of the communication apparatus that performs communication through the access point from a communication possible area as the state transition from the active state to the non-active state of the electronic apparatus activation control apparatus and stops outputting of the activation instruction to the network apparatus on the basis of a recognition of the state transition.

According to another embodiment of the present disclosure, there is provided an electronic apparatus activation control system including a network apparatus connected to a network and a network apparatus activation device. The network apparatus activation device is configured to output an activation instruction to the network apparatus via the network, and the network apparatus activation device includes a communication unit configured to perform communication via the network and a data processing unit configured to output the activation instruction to the network apparatus connected to the network through the communication unit. The data processing unit recognizes a state transition from a non-active state to an active state of the network apparatus activation device and outputs the activation instruction to the network apparatus on the basis of recognition of the state transition.

Further, in the embodiment of the electronic apparatus activation control system according to the present disclosure, in response to reception of the activation instruction from the network apparatus activation device, the network apparatus performs a transition process from a standby state in which a reception detection of the activation instruction is possible to an activation state in which an apparatus main operation is possible.

Further, in the embodiment of the electronic apparatus activation control system according to the present disclosure, the network apparatus periodically detects the reception of the activation instruction from the network apparatus activation device, and when the reception detection of the activation instruction is stopped in the periodical detection process, performs the transition process from the activation state to the standby state.

According to another embodiment of the present disclosure, there is provided an electronic apparatus activation control method performed by an electronic apparatus activation control apparatus. The electronic apparatus activation control apparatus includes a communication unit configured to perform communication via a network and a data processing unit configured to output an activation instruction to a network apparatus connected to the network through the communication unit. The data processing unit recognizes a state transition from a non-active state to an active state of the electronic apparatus activation control apparatus and outputs the activation instruction to the network apparatus on the basis of recognition of the state transition.

According to another embodiment of the present disclosure, there is provided a program causing an electronic apparatus activation control apparatus to execute an electronic apparatus activation control process. The electronic apparatus activation control apparatus includes a communication unit configured to perform communication via a network and a data processing unit configured to output an activation instruction to a network apparatus connected to the network through the communication unit. The program causes the data processing unit to recognize a state transition from a non-active state to an active state of the electronic apparatus activation control apparatus and output the activation instruction to the network apparatus on the basis of recognition of the state transition.

It should be noted that the program according to the embodiment of the present disclosure is a program which can be provided by a recording medium or a communication medium for providing the program to an information processing apparatus or a computer system that can execute various program codes in a computer-readable form. By providing the program in the computer-readable form, the process in accordance with the program is executed in the information processing apparatus or the computer system.

Other features or advantages of the present disclosure will be revealed by a detailed description based on the embodiment of the present disclosure to be described later and attached drawings. It should be noted that in the specification, a system refers to a logical complex structure of a plurality of apparatuses, and the apparatuses of the structure is not limited to be in the same casing.

According to the embodiments of the present disclosure, the apparatus and the method that perform the activation control for the electronic apparatus for achieving the power saving and improving the user's convenience are attained.

Specifically, the network apparatus that is network-connected and the network apparatus activation device that outputs the activation instruction to the network apparatus are provided. The network apparatus activation device includes the communication unit that performs communication via the network and the data processing unit that outputs the activation instruction to the network. The data processing unit recognizes the state transition from the non-active state to the active state of the network apparatus activation device and outputs the activation instruction to the network apparatus on the basis of the recognition of the state transition. In response to the reception of the activation instruction, the network apparatus performs the transition process from the standby state in which the reception detection of the activation instruction is performed to the activation state in which the apparatus main operation can be performed.

With this structure, the apparatus and the method that perform the activation control for the electronic apparatus for achieving the power saving and improving the user's convenience are attained.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 9 is a diagram showing an example of a registration list for performing an activation process only for a selected network apparatus.

DETAILED DESCRIPTION OF EMBODIMENTS

Figure 1:
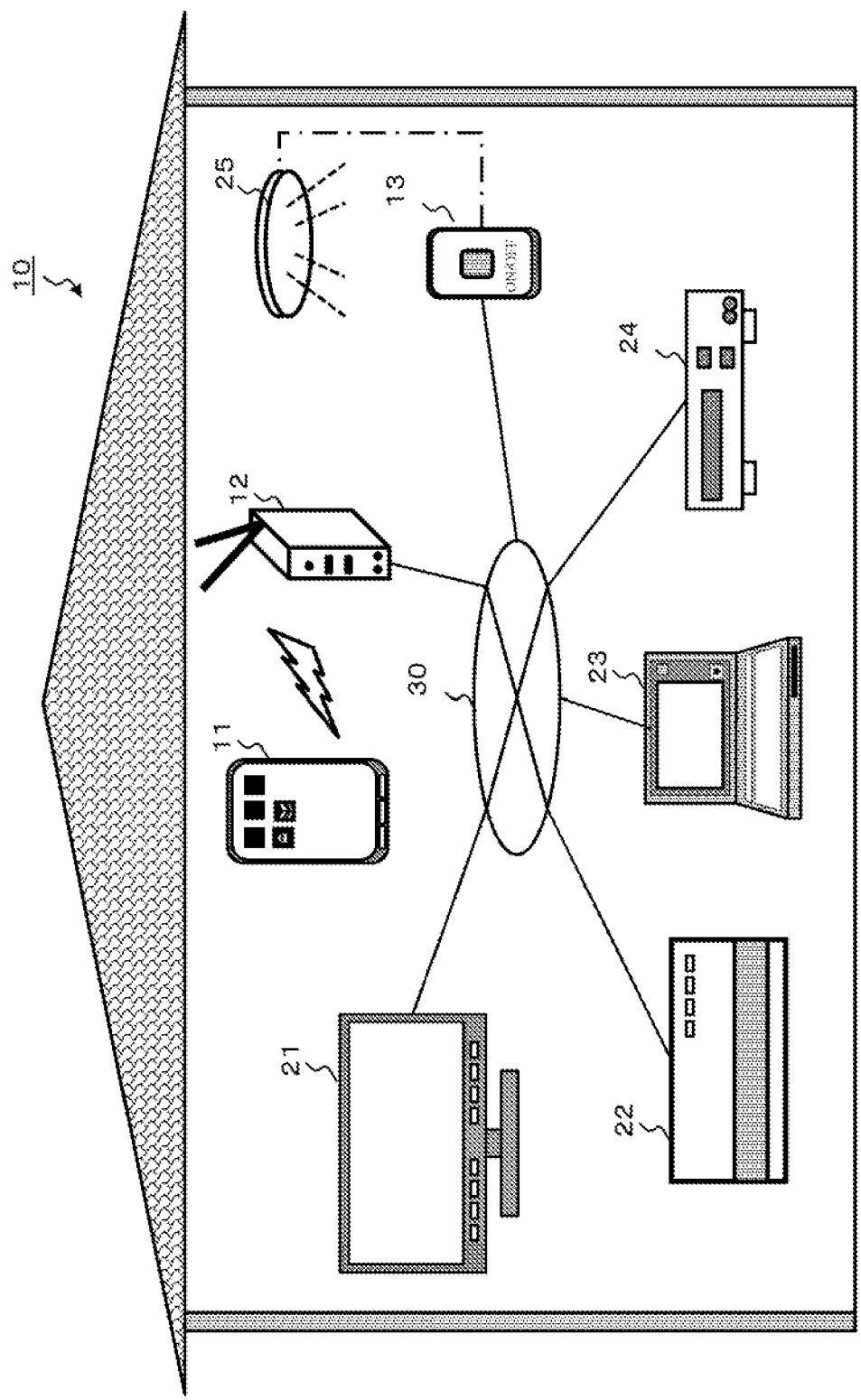
FIG. 1 is a diagram showing an example of a home network to which a process of the present disclosure can be applied.

Hereinafter, an electronic apparatus activation control apparatus, an electronic apparatus activation control system, an electronic apparatus activation control method, and a program of the present disclosure will be described in detail with reference to the drawings. It should be noted that the description will be given in the following order.
1. About example of entire structure of electronic apparatus activation control system
2. About basic process sequence of network apparatus activation device
3. About basic process sequence of network apparatus
4. About specific process example in case where network apparatus activation device is illumination switch
5. About specific process example in case where network apparatus activation device is access point (AP)
6. About output process specific example of activation instruction and modification example thereof
7. About example of hardware structure of apparatuses
8. Conclusion of structure of present disclosure (1. About Example of Entire Structure of Electronic Apparatus Activation Control System)

Hereinafter, the structure of the present disclosure will be described with reference to the drawings.

First, with reference to FIG. 1 and the like, an example of an entire structure of an electronic apparatus activation control system will be described.

FIG. 1 is a diagram showing an example of a home network 10.

There are various electronic apparatuses in a house.

For example, a communication terminal 11, an access point (AP) 12 such as a router which is wirelessly connected (Wi-Fi) with the communication terminal, an illumination switch 13, a TV 21, an air conditioner 22, a PC 23, a BD recorder 24, an illumination 25, and the like are provided.

Many of those apparatuses have the structure connected to each other via a network 30.

In the following description, an apparatus capable of performing communication via the network 30 is referred to as a "network apparatus".

One of the network apparatuses functions as a "network apparatus activation device" that performs power control for the other network apparatuses.

The "network apparatus activation device" outputs an activation instruction to the other "network apparatuses" via the network 30 by a user operation or a state transition as a trigger.

The "network apparatus" that has received the activation instruction from the "network apparatus activation device" shifts to an activation state when not in the activation state at the time of receiving the activation instruction.

It should be noted that the network apparatus is set to be in a state in which a reception detection function for the activation instruction via the network is executable regardless of whether the network apparatus is in the activation state or not.

However, in the case where the network apparatus is not in the activation state, a main function other than the reception detection function for the activation instruction is in an off state, and the apparatus is set to a standby state (standby mode) in which power consumption is minimized.

That is, the network apparatus shifts between the following two states (modes) in response to the reception of the activation instruction from the network apparatus activation device.
  (1) standby state (standby mode): with the reception detection function for the activation instruction
  (2) activation state: with both of the main function of the apparatus and the reception detection function for the activation instruction It should be noted that the network apparatus activation device that outputs the activation instruction to the network apparatuses has the following two states.
  (1) non-active state: a state of not outputting the activation instruction
  (2) active state: a state of outputting the activation instruction The above two states are held.

The transition between the two states is carried out by a specific user operation, communication between the network apparatus activation device and another device, a transition of the state of the apparatus, or the like as a trigger.

For example, in the case where the illumination switch 13 shown in FIG. 1 is the network apparatus activation device, when a user operates the illumination switch 13 to set a state thereof from off to on, the illumination switch 13 shifts from the non-active state to the active state and outputs the activation instruction to the network apparatuses.

It should be noted that when in the active state, the network apparatus activation device periodically outputs the activation instruction to the network apparatuses.

During the periodical reception of the activation instruction from the network apparatus activation device, the network apparatuses maintain the activation state. In the case where the reception of the periodical activation instruction from the network apparatus activation device is stopped, and the network apparatuses do not receive the activation instruction and a user operation for a preset period, the network apparatuses shift to the standby state.

A specific sequence thereof will be described later.

Further, for example, in the case where the access point (AP) 12 such as the router shown in FIG. 1 is the network apparatus activation device, when the access point (AP) 12 confirms a connection or an access of the communication terminal 11, the access point (AP) 12 shifts from the non-active state to the active state and outputs the activation instruction to the network apparatuses at the state transition time point.

It should be noted that when in the active state, the network apparatus activation device periodically outputs the activation instruction to the network apparatuses.

As described above, various network apparatuses can be the network apparatus activation device.

State transition processes of the network apparatus activation device and the network apparatuses will be described with reference to FIG. 2.

Figure 2:
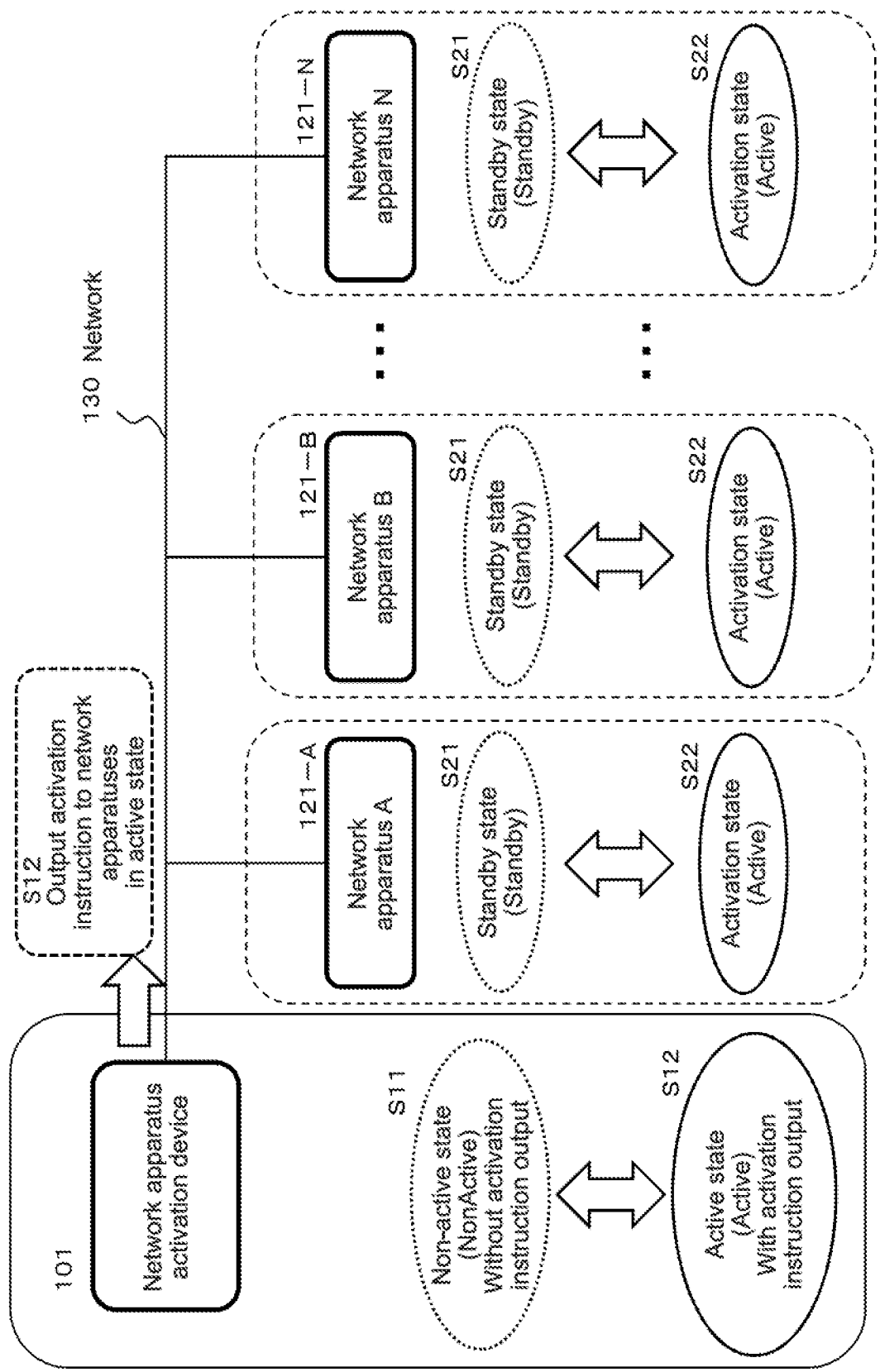
FIG. 2 is a diagram for explaining state transitions and processes of network apparatuses and a network apparatus activation device that performs the process of the present disclosure.

FIG. 2 shows a network apparatus activation device 101 and a plurality of network apparatuses (network apparatus A, 121-A to network apparatus N, 121-N).

Those have the structure which allows communication via a network 130.

The network apparatus activation device 101 has the following two states:

(S11) non-active state: a state of not outputting the activation instruction, and (S12) active state: a state of outputting the activation instruction.

The transition between the two states is caused by a specific user operation or a transition of the apparatus state.

On the other hand, the network apparatuses 121-A to 121-N have the following two states:

(S21) standby state (standby mode): with the reception detection function for the activation instruction, and (S22) activation state: with both of the main function of the apparatus and the reception detection function for the activation instruction.

The network apparatuses shift between the two states (modes) in response to the reception of the activation instruction from the network apparatus activation device.

(2. About basic process sequence of network apparatus activation device)

Subsequently, a basic process sequence of the network apparatus activation device that outputs the activation instruction to the network apparatuses will be described with reference to a flowchart shown in FIG. 3.

Figure 3:
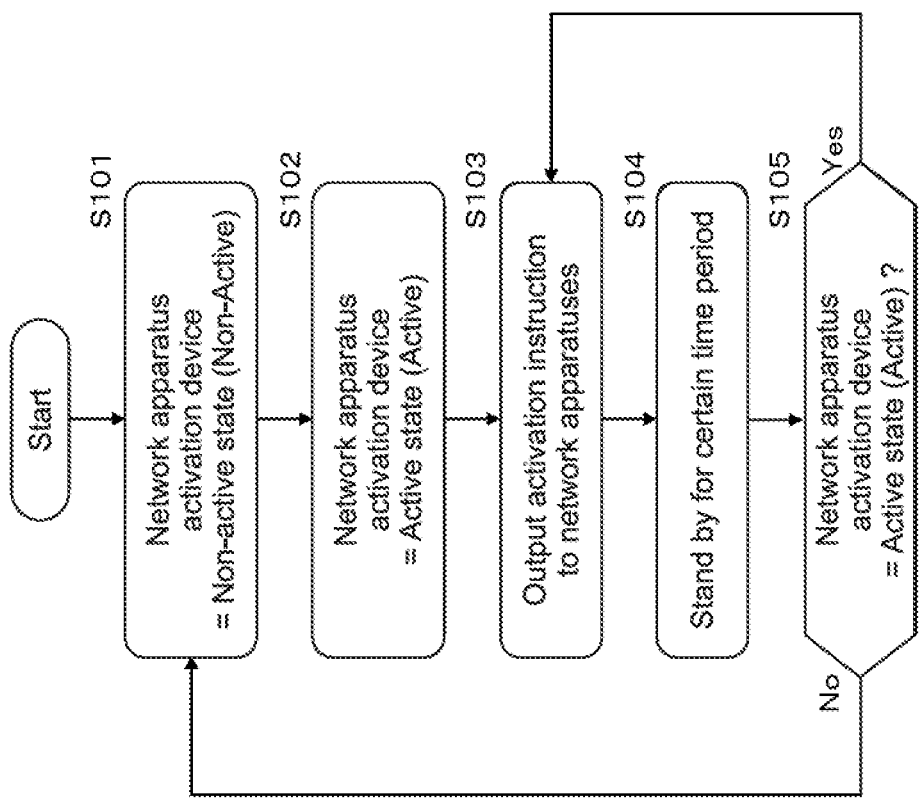
FIG. 3 is a flowchart showing a basic process sequence of the network apparatus activation device.

It should be noted that the process along the flowchart shown in FIG. 3 is performed in a data processing unit formed by a CPU and the like having a program execution function of the network apparatus activation device in accordance with a program stored in a memory of the network apparatus activation device.

First, in Step S101, the network apparatus activation device is in a non-active state (Non-Active). The non-active state is a state in which the activation instruction is not output.

Next, in Step S102, the network apparatus activation device is set to an active state (Active). The active state is a state in which the activation instruction is periodically output to the network apparatuses.

A transition condition from the non-active state in Step S101 to the active state in Step S102 is different depending on a kind of the network apparatus activation device.

Specifically, as described above, if the network apparatus activation device is the illumination switch 13 shown in FIG. 1, the network apparatus activation device shifts from the non-active state to the active state by being turned on by a user.

Further, if the network apparatus activation device is the access point (AP) 12 shown in FIG. 1, the network apparatus activation device shifts from the non-active state to the active state by a connection detection of the communication terminal 11.

In Step S102, when the network apparatus activation device shifts to the active state, the network apparatus activation device outputs the activation instruction to the network apparatuses in Step S103.

After that, in Step S104, the network apparatus activation device is in a standby state for a preset time period.

Then, in Step S105, it is determined whether the network apparatus activation device is maintained to be in the active state or not.

In the case where the network apparatus activation device is maintained to be in the active state, the process returns to Step 103, and the activation instruction is repeatedly output to the network apparatuses.

In this way, in the case where the network apparatus activation device is maintained to be in the active state, the activation instruction is periodically output to the network apparatuses.

On the other hand, in Step S105, when it is determined that the network apparatus activation device is not maintained to be in the active state, the process returns to Step S101, and the network apparatus activation device is maintained to be the non-active state in which the activation instruction is not output.

(3. About Basic Process Sequence of Network Apparatus)

Next, a basic process sequence of a network apparatus to which the network apparatus activation device inputs the activation instruction will be described with reference to a flowchart shown in FIG. 4.

Figure 4:
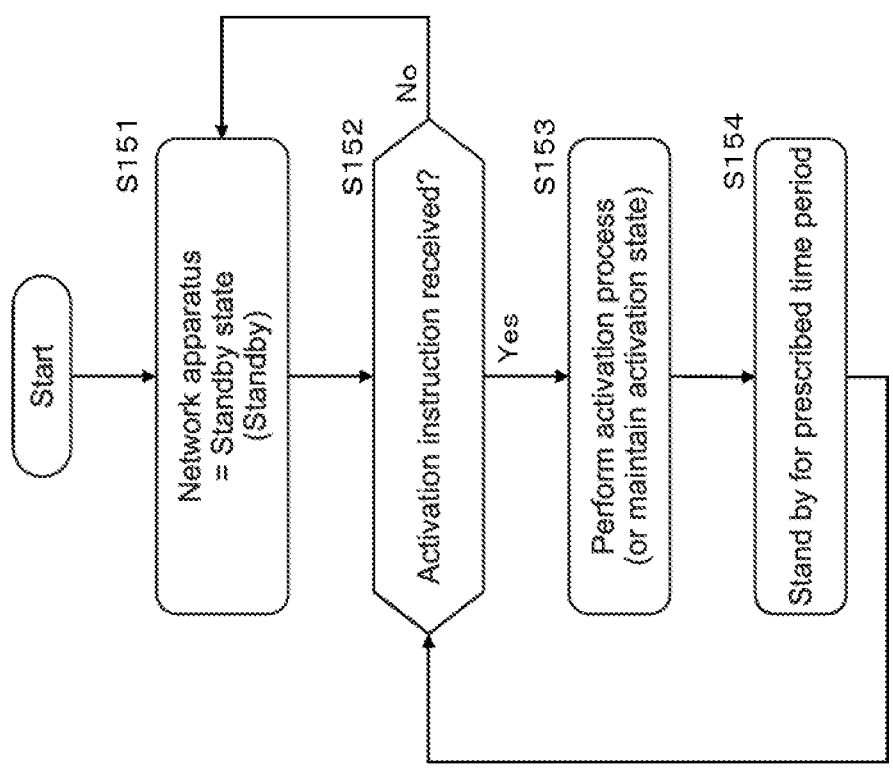
FIG. 4 is a flowchart showing a basic process sequence of the network apparatus.

It should be noted that the process along the flowchart shown in FIG. 4 is performed by the data processing unit formed by the CPU and the like having a program execution function of the network apparatus in accordance with the program stored in the memory of the network apparatus.

First, in Step S151, the network apparatus is in a standby state (Standby). The standby state is an off state of the main function of the network apparatus. But the network apparatus has the input detection function for the activation instruction.

Next, in Step S152, it is determined whether the network apparatus receives the activation instruction output from the network apparatus activation device or not. If the network apparatus does not receive the activation instruction, the standby state (Standby) in Step S151 is maintained.

On the other hand, in Step S152, if it is determined that the network apparatus receives the activation instruction output from the network apparatus activation device, the process proceeds to Step S153.

In Step S153, the network apparatus performs the activation process and shifts to the activation state (Active).

The activation state is the state in which the main function of the network apparatus can be executed. It should be noted that in the activation state, the state in which the reception detection of the activation instruction can be performed is also maintained.

In Step S154, when the network apparatus is in a standby state for a prescribed time period, the process returns to Step S152 to determine whether a new activation instruction from the network apparatus activation device is received or not.

In the case where the activation instruction is received in the prescribed time period, the process proceeds to Step S153, and the activation state is maintained.

In the case where the reception of the activation instruction is continued within the prescribed time period, a loop of Step S152 to S154 is repeatedly performed, and the network apparatus maintains the activation state.

On the other hand, after the prescribed time period elapses in Step S154, when it is determined that the new activation instruction from the network apparatus activation device is not received, the process returns to Step S151, and the network apparatus shifts to the standby state.

It should be noted that the process sequence of Steps S154 to S151 via Step S152 corresponds to a process sequence generated in the case where, when the network apparatus activation device is the illumination switch 13 shown in FIG. 1, the user turns off the illumination switch 13, and the output of the activation instruction from the network apparatus activation device (illumination switch 13) is stopped.

By performing the above-mentioned process, it is possible to set the network apparatus to a usable state instantly when necessary without generating wasted power consumption.

(4. About Specific Process Example in Case where Network Apparatus Activation Device is Illumination Switch)

Next, with reference to FIGS. 5 and 6, a specific process example in the case where the network apparatus activation device is the illumination switch will be described.

Figure 5:
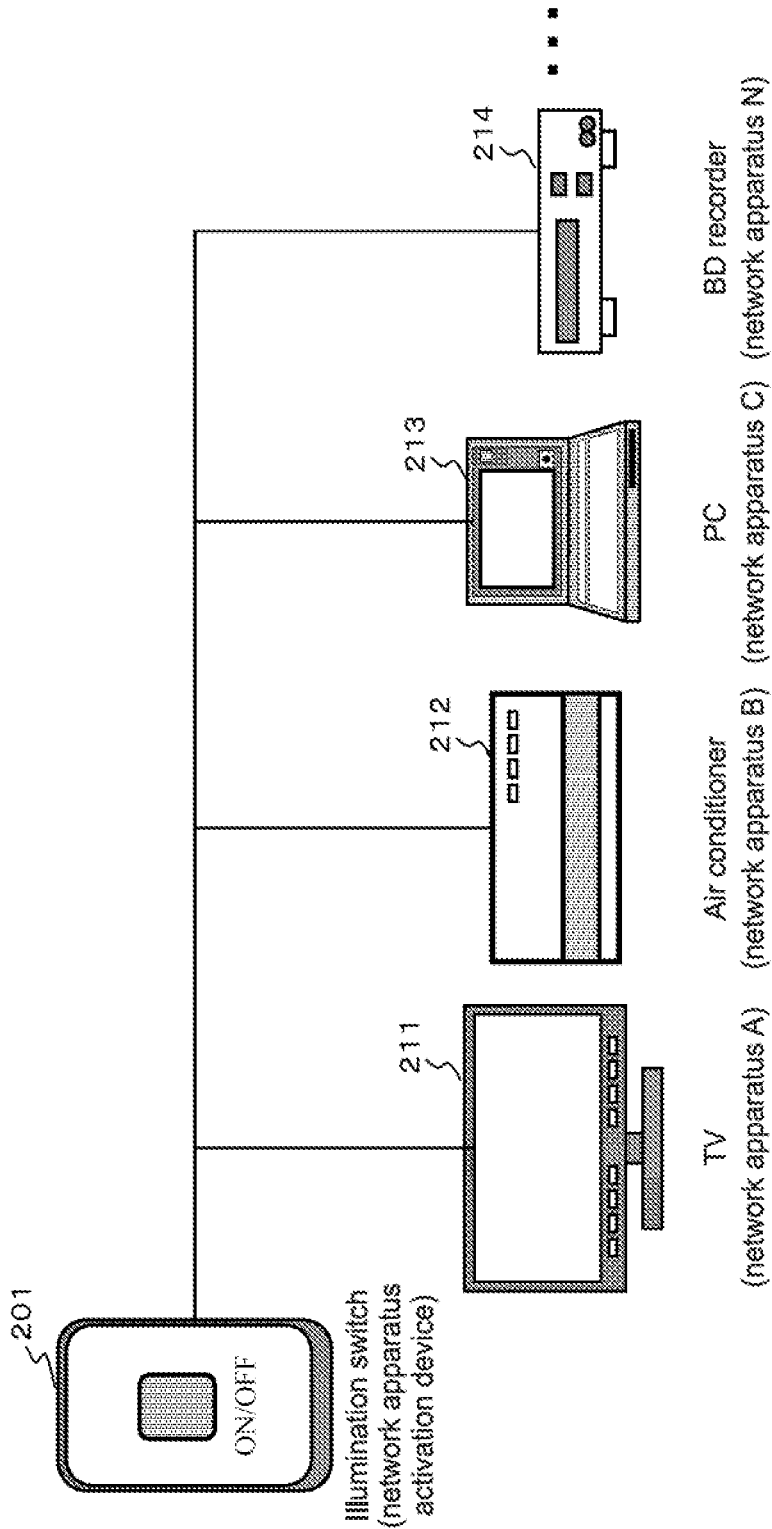
FIG. 5 is a diagram showing an example of the apparatus structure in the case where the network apparatus activation device is an illumination switch.

A home network structure as shown in FIG. 5 is considered.

That is, the network apparatus activation device is an illumination switch 201.

The network apparatuses are a TV 211, an air conditioner 212, a PC 213, a BD recorder 214, and the like.

The illumination switch 201 as the network apparatus activation device and the TV 211, the air conditioner 212, the PC 213, the BD recorder 214, and the like as the network apparatuses are connected and can be communicated with each other via a network.

The illumination switch 201 outputs the activation instruction to the TV 211, the air conditioner 212, the PC 213, the BD recorder 214, and the like as the network apparatuses via the network.

For example, when a user performs an operation to turn on the illumination switch 201, the illumination switch 201 shifts from the non-active state (Non-Active) to the active state (Active).

In the case where the illumination switch 201 is in the active state (Active), the illumination switch 201 repeatedly outputs the activation instruction to the TV 211, the air conditioner 212, the PC 213, the BD recorder 214, and the like as the network apparatuses via the network every certain time period.

Upon reception of the activation instruction from the illumination switch 201 as the network apparatus activation device, the TV 211, the air conditioner 212, the PC 213, the BD recorder 214, and the like as the network apparatuses shift from the standby state to the activation state when in the standby state. When in the activation state, the network apparatuses maintain the activation state.

Figure 6:
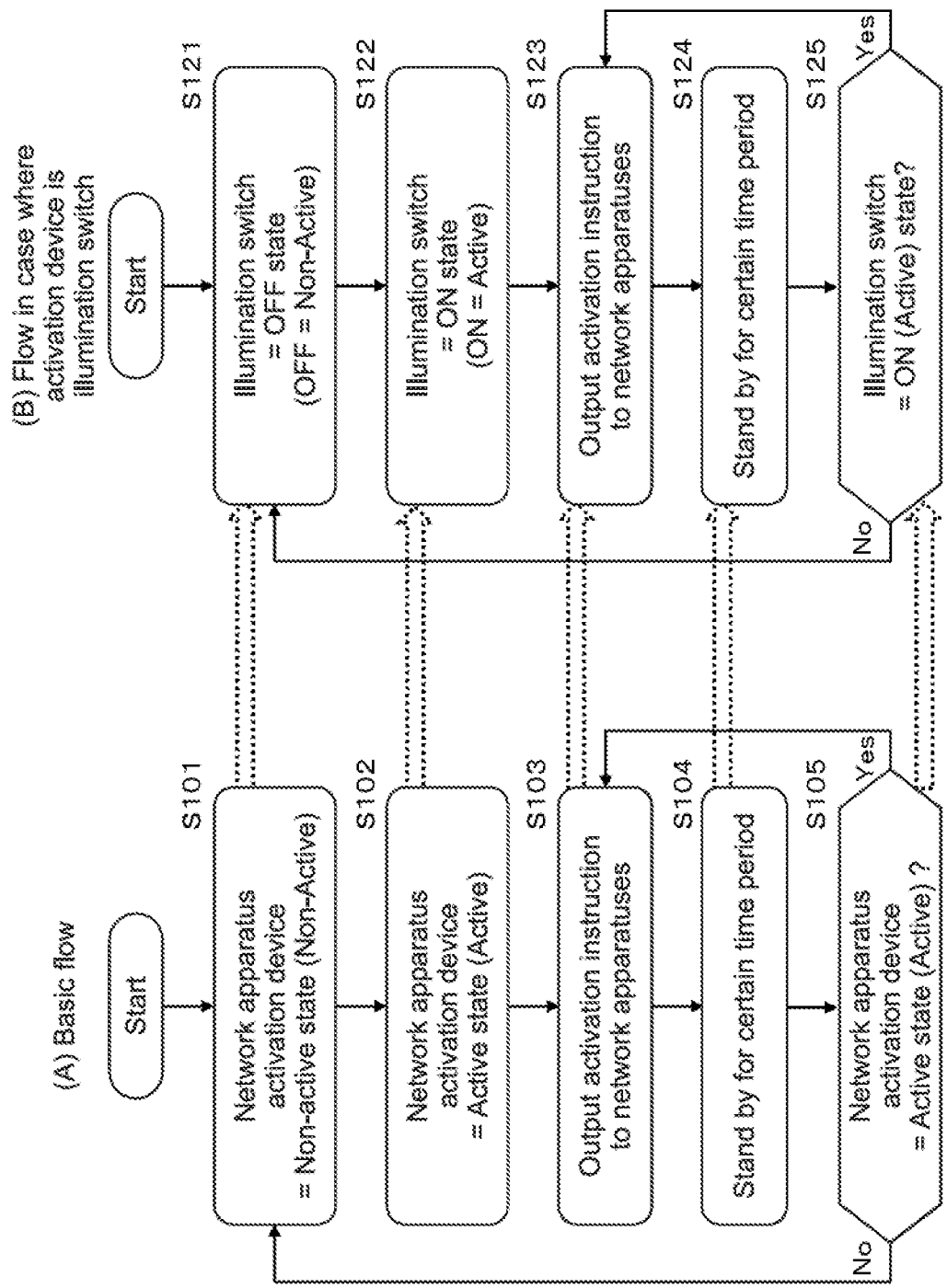
FIG. 6 is a flowchart showing a process sequence in the case where the network apparatus activation device is the illumination switch.

FIG. 6 is a diagram showing a flowchart (A) of the basic process sequence of the network apparatus activation device described above with reference to FIG. 3 and a flowchart (B) of a specific process sequence in the case where the network apparatus activation device is the illumination switch with the flowcharts (A) and (B) associated with each other.

The flowchart (A) is described above with reference to FIG. 3.

Steps S121 to S125 shown in the flowchart (B) in the case where the network apparatus activation device is the illumination switch correspond to the processes of Steps S101 to S105 of the flowchart (A).

Processes of Steps S121 to S125 shown in the flowchart (B) in the case where the network apparatus activation device is the illumination switch will be described.

First, in Step S121, the illumination switch 201 as the network apparatus activation device is in an off state and in the non-active state (Non-Active). The non-active state is a state in which the activation instruction is not output.

Then, in Step S122, the illumination switch 201 as the network apparatus activation device is set to the active state (Active). That is, the illumination switch 201 is turned on by a user operation. The active state is a state in which the activation instruction is periodically output to the network apparatuses.

In Step S122, when the illumination switch 201 as the network apparatus activation device shifts to the active state, the illumination switch 201 as the network apparatus activation device then outputs the activation instruction to the network apparatuses in Step S123.

In this example, the activation instruction is output to the TV 211, the air conditioner 212, the PC 213, the BD recorder 214, and the like.

After that, the illumination switch 201 as the network apparatus activation device is brought into a standby state for a preset time period in Step S124.

Further, it is determined whether the illumination switch 201 as the network apparatus activation device is maintained to be in the active state or not in Step S125.

In the case where the illumination switch 201 as the network apparatus activation device is in the active state, the process returns to Step S123, and the illumination switch 201 repeatedly outputs the activation instruction to the network apparatuses.

In the case where the illumination switch 201 as the network apparatus activation device is in the active state, that is, in the on state, the activation instruction is periodically output to the network apparatuses, that is, to the TV 211, the air conditioner 212, the PC 213, the BD recorder 214, and the like.

On the other hand, in Step S125, in the case where it is determined that the illumination switch 201 as the network apparatus activation device is not in the active state, that is, the illumination switch 201 is set to off, the process returns to Step S121, and the illumination switch 201 as the network apparatus activation device is set to the non-active state in which the activation instruction is not output.

(5. About Specific Process Example in Case where Network Apparatus Activation Device is Access Point (AP))

Next, with reference to FIG. 7 and the following figures, a specific process example in the case where the network apparatus activation device is the access point (AP) such as a router will be described.

Figure 7:
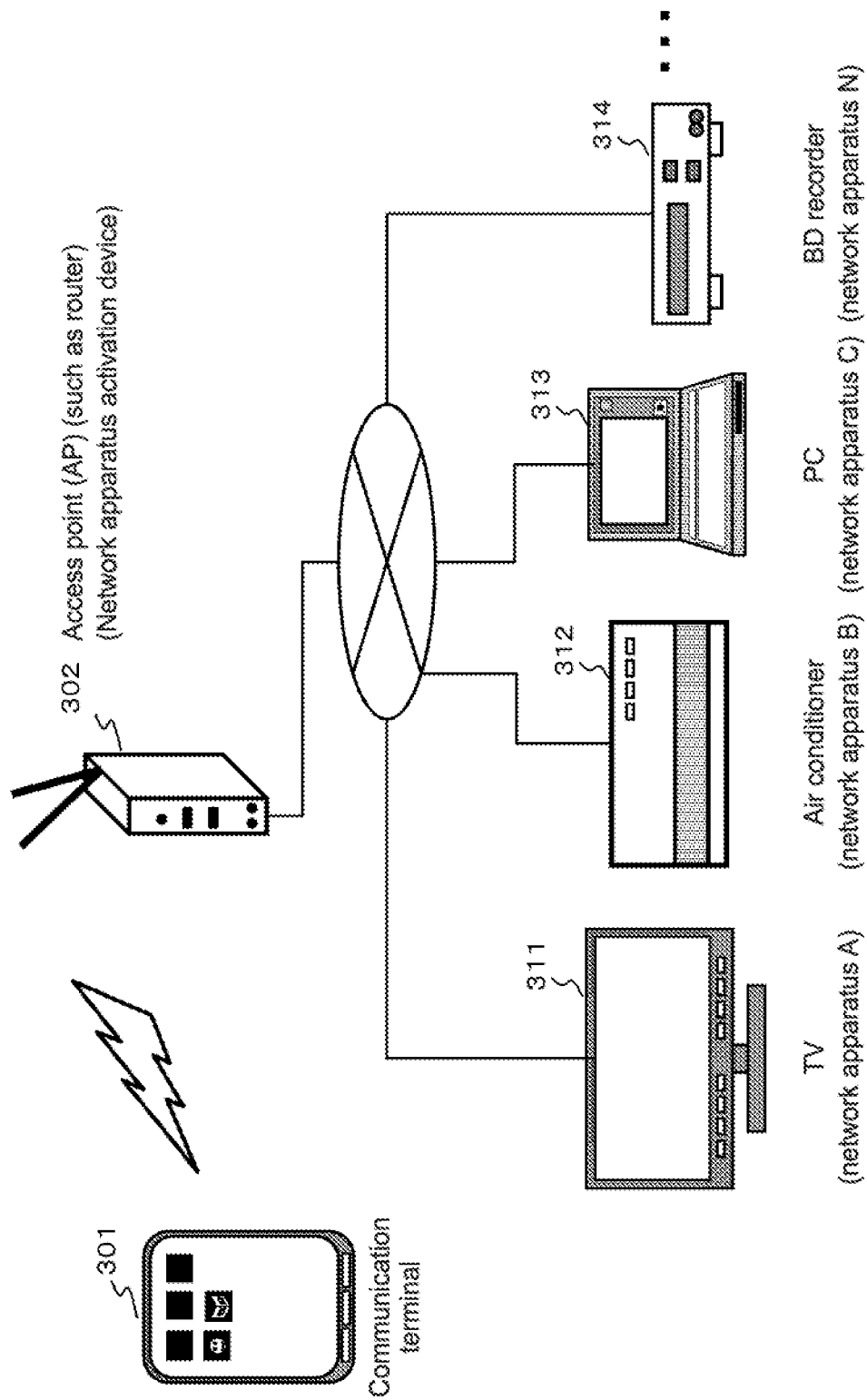
FIG. 7 is a diagram showing an example of the apparatus structure in the case where the network apparatus activation device is an access point (AP) such as a router.

A home network structure as shown in FIG. 7 is considered.

That is, the network apparatus activation device is an access point (AP) 302 such as a router for network-connecting a communication terminal 301.

The network apparatuses are a TV 311, an air conditioner 312, a PC 313, a BD recorder 314, and the like.

The access point (AP) 302 as the network apparatus activation device and the TV 311, the air conditioner 312, the PC 313, the BD recorder 314, and the like as the network apparatuses are connected and can be communicated with each other via a network.

The access point (AP) 302 outputs the activation instruction to the TV 311, the air conditioner 312, the PC 313, the BD recorder 314, and the like as the network apparatuses via the network.

For example, if the access point (AP) 302 succeeds in a detection of the communication terminal 301, the access point (AP) 302 shifts from the non-active state (Non-Active) to the active state (Active).

The communication terminal 301 is a terminal registered in advance as a terminal that permits communication via the access point (AP) 302.

In the case where the registered terminal enters a communication possible area of the access point (AP) 302, and the access point (AP) 302 recognizes the communication terminal 301, the access point (AP) 302 shifts from the non-active state (Non-Active) to the active state (Active).

When the access point (AP) 302 is in the active state (Active), the access point (AP) 302 repeatedly outputs the activation instruction to the TV 311, the air conditioner 312, the PC 313, the BD recorder 314, and the like as the network apparatuses via the network every certain time period.

Upon reception of the activation instruction from the access point (AP) 302 as the network apparatus activation device, the TV 311, the air conditioner 312, the PC 313, the BD recorder 314, and the like as the network apparatuses shift from the standby state to the activation state when those apparatuses are in the standby state, or maintains the activation state when those apparatuses are in the activation state.

Figure 8:
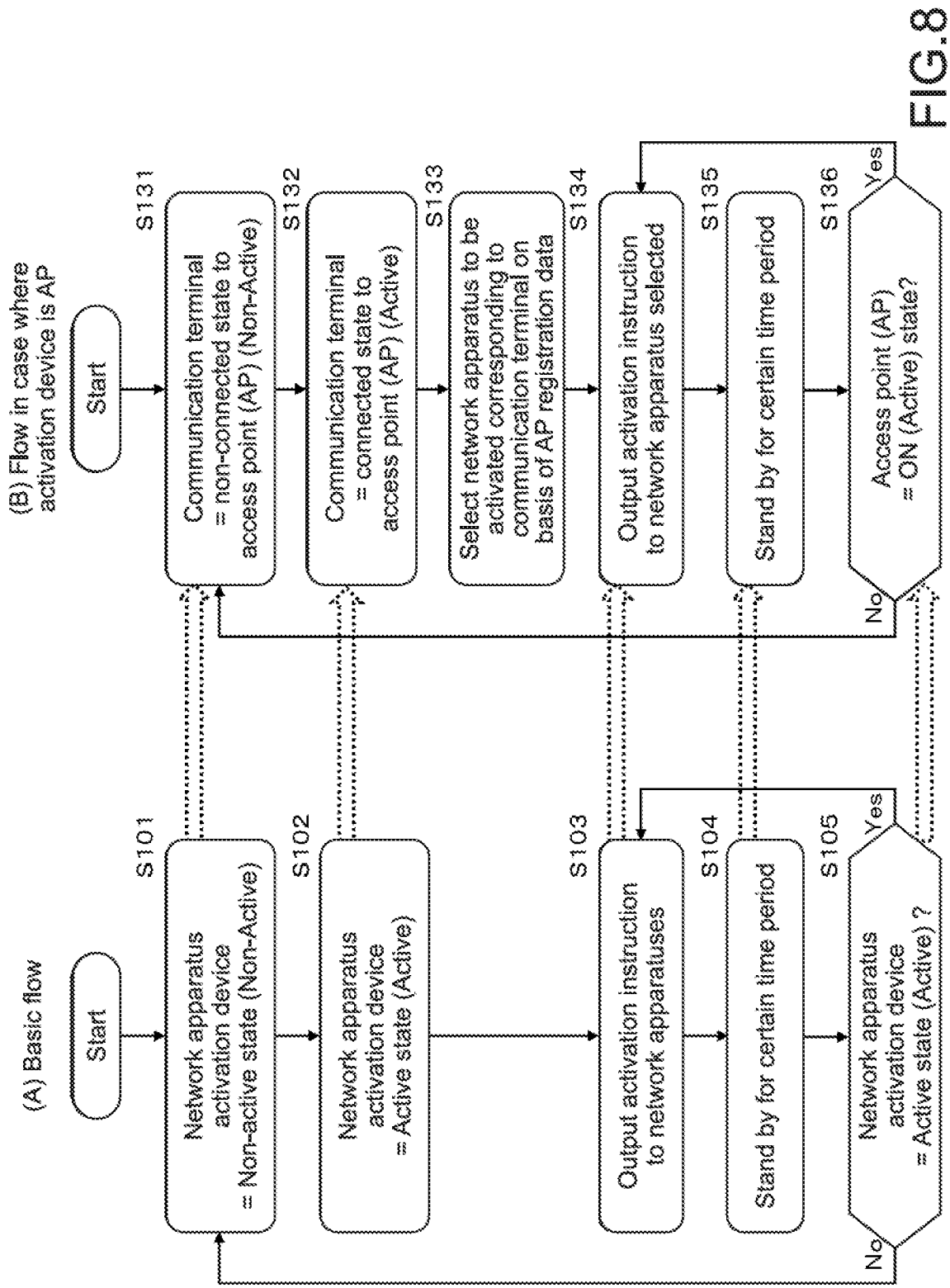
FIG. 8 is a flowchart showing a process sequence in the case where the network apparatus activation device is the access point (AP) such as the router.

FIG. 8 is a diagram showing a flowchart (A) of the basic process sequence of the network apparatus activation device described above with reference to FIG. 3 and a flowchart (B) of a specific process sequence in the case where the network apparatus activation device is the access point (AP) with the flowcharts (A) and (B) associated with each other.

The flowchart (A) is described above with reference to FIG. 3.

Steps S131 to S132 shown in the flowchart (B) in the case where the network apparatus activation device is the access point (AP) correspond to the processes of Steps S101 to S102 of the flowchart (A), and Steps S134 to S136 shown in the flowchart (B) correspond to the processes of Steps S103 to S105 of the flowchart (A).

In this embodiment, a process of Step S133 is a process unique to this embodiment.

The processes of Steps S131 to S136 of the flowchart (B) in the case where the network apparatus activation device is the access point (AP) will be described.

First, in Step S131, the access point (AP) 302 as the network apparatus activation device does not detect the communication terminal 301 registered and is in the non-active state (Non-Active). The non-active state is a state in which the activation instruction is not output.

Then, in Step S132, the access point (AP) 302 as the network apparatus activation device detects the communication terminal 301 registered and is set to the active state (Active). That is, the communication terminal 301 registered enters the communication possible area of the access point (AP) and is brought into a communication possible state with the access point (AP) 302. The active state is the state in which the activation instruction is periodically output to the network apparatuses.

The process of Step S133 is unique to this embodiment.

In Step S133, the access point (AP) 302 as the network apparatus activation device refers to register information relating to the communication terminal 301 set in the communication possible state with the access point (AP) 302.

In a memory in the access point (AP) 302, the register information shown in FIG. 9 is recorded, for example.

That is, as shown in FIG. 9, the register information (list) is provided which makes it possible to identify network apparatuses to be activated and MAC addresses thereof for a plurality of communication terminals that are permitted to perform communication through the access point (AP) 302.

The access point (AP) 302 as the network apparatus activation device first obtains communication terminal identification information received from the communication terminal 301 and confirms that the communication terminal 301 is a communication permitted terminal.

After that, on the basis of the communication terminal identification information received from the communication terminal 301, the access point 302 selects an entry corresponding to the identification terminal from the register information shown in FIG. 9 and selects a network apparatus to be activated recorded in the entry.

For example, in the case where the communication terminal 301 is a communication terminal of a user A shown in FIG. 9, the network apparatuses to be activated are a TV, an air conditioner, a PC, and a BD recorder.

Further, for example, in the case where the communication terminal 301 is a communication terminal of a user B shown in FIG. 9, the network apparatus to be activated is only the TV.

Further, for example, in the case where the communication terminal 301 is a communication terminal of a user C shown in FIG. 9, the network apparatuses to be activated are the PC and the BD recorder.

The activation network apparatus information is registered in advance to the access point (AP) 302 as the network apparatus activation device and stored in the memory.

In Step S133, the access point (AP) 302 as the network apparatus activation device refers to the register information relating to the communication terminal 301 set to be the communication possible state with the access point (AP) 302, that is, the register information shown in FIG. 9, for example and selects the network apparatus to be activated.

In Step S134, the access point (AP) 302 as the network apparatus activation device outputs the activation instruction to the network apparatus selected in Step S133. For example, an activation instruction packet which makes it possible to identify the apparatus to be activated by applying the MAC address of the apparatus selected is transmitted.

In this embodiment, the activation instruction is transmitted as an activation instruction effective to a specific selected apparatus.

That is, in shifting from the non-active state to the active state, the access point (AP) 302 as the network apparatus activation device identifies the apparatus or the user that causes the shift in the state, selects the network apparatus to be an activation target in accordance with the identification result, and outputs the activation instruction for activating only the selected network apparatus.

It should be noted that, to transmit the activation instruction for activating only the selected apparatus, some methods can be provided. For example, either one of the following processes may be performed.

(A) An address corresponding to the selected apparatus is set, and the activation instruction packet is transmitted only to the selected apparatus. In this case, only the apparatus that receives the packet performs the activation process.

(B) An activation instruction packet in which identifiers of the apparatuses to be activated are described is transmitted to each of the apparatuses, and when checking the apparatus identifiers and confirming that the apparatus identifier of its own is recorded, the apparatus that has received the packet performs activation.

For example, by performing either one of the processes (A) and (B), it is possible to activate only the selected apparatus.

After that, the access point (AP) 302 as the network apparatus activation device stands by for a preset time period in Step S135.

Further, it is determined whether the access point (AP) 302 as the network apparatus activation device maintains the active state or not in Step S136.

In the case where the access point (AP) 302 as the network apparatus activation device is maintained to be in the active state, the process returns to Step S134, and the access point (AP) 302 repeatedly outputs the activation instruction to the network apparatus selected.

In the case where the access point (AP) 302 as the network apparatus activation device is maintained to be in the active state, that is, in the on state, the activation instruction is periodically output to the selected network apparatus.

On the other hand, in Step S136, if it is determined that the access point (AP) 302 as the network apparatus activation device is not maintained to be in the active state, that is, the access point (AP) 302 is difficult to detect the communication terminal 301, the process returns to Step S131, and the access point (AP) 302 as the network apparatus activation device is set to the non-active state in which the activation instruction is not output.

As described above, in this embodiment, it is possible to select the network apparatus to be activated for each of the users who use the communication terminals.

(6. About Output Process Specific Example of Activation Instruction and Modification Example Thereof)

In the above embodiment, the activation instruction output to the network apparatuses can be transmitted with the activation instruction stored in a general communication packet.

In addition, for example, a magic packet developed by AMD (Advanced Micro Devices, Inc.) can be used.

In the structure in which the magic packet is used, the network apparatus activation device holds the list of the MAC addresses of the network apparatuses as described above with reference to FIG. 9 and transmits the magic packet in which the MAC address described in the list is set as a destination. Through this process, it is possible to output the activation instruction to the network apparatuses.

Further, as described above with reference to FIG. 9, the structure in which the activation instruction is transmitted only to the specific selected apparatus may be used.

It should be noted that the list of the MAC addresses may be created at the time of initial setting of the network apparatus activation device and may be periodically updated at the time of the active state shift.

On the other hand, the network apparatus activates the apparatus itself at the time of receiving the magic packet on the basis of the packet received.

Further, in the above embodiment, as the examples of the network apparatus activation device, the illumination switch and the access point (AP) are given, but various other apparatuses can be used as the network apparatus activation device.

Any device can be used for the network apparatus activation device, as long as the device is capable of taking part in the network. For example, a key of a house having a communication function, a motion sensor for crime prevention, an authentication type socket, or the like may be used.

Further, a communication terminal such as a mobile phone may access the network apparatus activation device (such as the access point) in a house via a mobile line, thereby secondarily transmitting the activation instruction. In this case, the communication terminal itself functions as the network apparatus activation device.

It should be noted that the network is not limited to the IP-based network, and another communication infrastructure such as IR can be used.

(7. About Example of Hardware Structure of Apparatuses)

Figure 10:
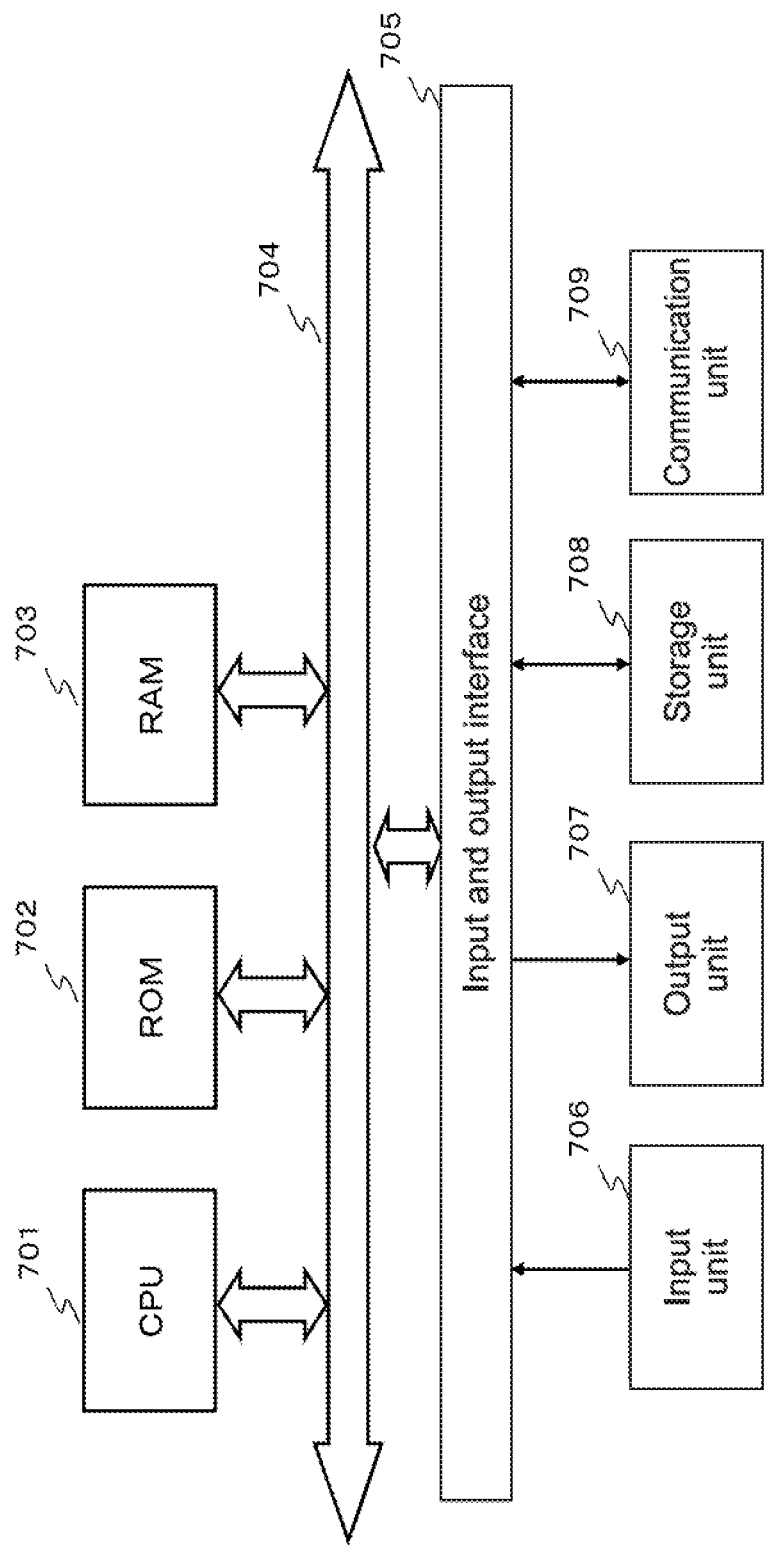
FIG. 10 is a diagram showing an example of the hardware structure of the network apparatus and the network apparatus activation device.

With reference to FIG. 10, an example of the hardware structure of the apparatuses that performs the above-described processes.

FIG. 10 is an example of the hardware structure of an information processing apparatus which can be used as the network apparatus activation device or the network apparatus.

A CPU (central processing unit) 701 functions as a data processing unit that performs the various processes on the basis of a program stored in a ROM (read only memory) 702 or a storage unit 708. For example, the processes based on the above-described sequences are performed. In a RAM (random access memory) 703, a program, data, and the like to be executed by the CPU 701 are stored. The CPU 701, the ROM 702, and the RAM 703 are connected to each other through a bus 704.

The CPU 701 is connected to an input and output interface 705 via the bus 704. To the input and output interface 705, an input unit 706 such as various switches, a keyboard, a mouse, and a microphone and an output unit 707 such as a display and a speaker are connected. The CPU 701 performs the various processes on the basis of an instruction input from the input unit 706 and outputs a process result to the output unit 707, for example.

The storage unit 708 connected to the input and output interface 705 is formed of a hard disk or the like and stores programs and various pieces of data executed by the CPU 701. The communication unit 709 communicates with an external apparatus via a network such as the Internet and a local area network.

It should be noted that the example of the apparatus structure shown in FIG. 10 is merely an example, and the entire structure may not necessarily be provided. The structure having the memory that stores the program in which the process sequences described in the above embodiment is recorded, the data processing unit provided with the CPU and the like that can execute the program, the communication unit, and the like only has to be provided.

It should be noted that the network apparatuses each have hardware unique to the apparatuses, for example, the hardware structure depending on the apparatuses such as a TV and a PC.

(8. Conclusion of Structure of Present Disclosure)

In the above, the embodiment of the present disclosure is described in detail with reference to the specific embodiment. It should be understood by those skilled in the art that various modifications, combinations, sub-combinations and alterations may occur depending on design requirements and other factors insofar as they are within the scope of the appended claims or the equivalents thereof.

It should be noted that the present disclosure can take the following configurations.

(1) An electronic apparatus activation control apparatus, including:
　a communication unit configured to perform communication via a network; and
　a data processing unit configured to output an activation instruction to a network apparatus connected to the network through the communication unit, the data processing unit recognizing a state transition from a non-active state to an active state of the electronic apparatus activation control apparatus and outputting the activation instruction to the network apparatus on the basis of recognition of the state transition.

(2) The electronic apparatus activation control apparatus according to Item (1), in which
　the data processing unit periodically performs a state detection of the electronic apparatus activation control apparatus, and in the case where the electronic apparatus activation control apparatus maintains to be in the active state, periodically outputs the activation instruction to the network apparatus.

(3) The electronic apparatus activation control apparatus according to Item (1) or (2), in which
　the data processing unit periodically performs a state detection of the electronic apparatus activation control apparatus, and when recognizing that the electronic apparatus activation control apparatus shifts from the active state to the non-active state, stops outputting of the activation instruction to the network apparatus.

(4) The electronic apparatus activation control apparatus according to any one of Items (1) to (3), in which
　in the state transition from the non-active state to the active state, the data processing unit determines one of an apparatus and a user that causes the state transition, selects the network apparatus to be activated on the basis of a determination result, and outputs the activation instruction for activating only the network apparatus selected.

(5) The electronic apparatus activation control apparatus according to any one of Items (1) to (4),
　the electronic apparatus activation control apparatus being an illumination switch, in which the data processing unit recognizes an operation of turning on the illumination switch by a user as the state transition from the non-active state to the active state of the electronic apparatus activation control apparatus and outputs the activation instruction to the network apparatus on the basis of the recognition of the state transition.

(6) The electronic apparatus activation control apparatus according to any one of Items (1) to (5),
　the electronic apparatus activation control apparatus being an illumination switch, in which the data processing unit recognizes an operation of turning off the illumination switch by a user as the state transition from the active state to the non-active state of the electronic apparatus activation control apparatus and stops outputting of the activation instruction to the network apparatus on the basis of the recognition of the state transition.

(7) The electronic apparatus activation control apparatus according to any one of Items (1) to (4),
　the electronic apparatus activation control apparatus being an access point serving as a relay apparatus of a communication apparatus, in which
　the data processing unit recognizes a detection of the communication apparatus that performs communication through the access point from a communication possible area as the state transition from the non-active state to the active state of the electronic apparatus activation control apparatus and outputs the activation instruction to the network apparatus on the basis of the recognition of the state transition.

(8) The electronic apparatus activation control apparatus according to Item (7), in which
　the data processing unit identifies the communication apparatus, selects the network apparatus to be activated on the basis of an identification result, and outputs the activation instruction for activating only the network apparatus selected.

(9) The electronic apparatus activation control apparatus according to any one of Items (1) to (4),
　the electronic apparatus activation control apparatus being an access point serving as a relay apparatus of a communication apparatus, in which
　the data processing unit recognizes a non-detection of the communication apparatus that performs communication through the access point from a communication possible area as the state transition from the active state to the non-active state of the electronic apparatus activation control apparatus and stops outputting of the activation instruction to the network apparatus on the basis of a recognition of the state transition.

(10) An electronic apparatus activation control system, including:
　a network apparatus connected to a network; and
　a network apparatus activation device configured to output an activation instruction to the network apparatus via the network, the network apparatus activation device including a communication unit configured to perform communication via the network and a data processing unit configured to output the activation instruction to the network apparatus connected to the network through the communication unit, the data processing unit recognizing a state transition from a non-active state to an active state of the network apparatus activation device and outputting the activation instruction to the network apparatus on the basis of recognition of the state transition.

(11) The electronic apparatus activation control system according to Item (10), in which
　in response to reception of the activation instruction from the network apparatus activation device, the network apparatus performs a transition process from a standby state in which a reception detection of the activation instruction is possible to an activation state in which an apparatus main operation is possible.

Further, a method for a process performed in the apparatus and system described above and a program causing the process to be executed are also included in the structure of the present disclosure.

Furthermore, the series of processes described in the specification can be performed by hardware, software, or a composite structure of the hardware and software. In the case where the process by the software is performed, a program in which a process sequence is recorded can be executed by being installed in a memory in a computer which is incorporated in dedicated hardware, or the program can be executed by being installed in a general-purpose computer that can perform various processes. For example, it is possible to record the program in a recording medium in advance. It is possible to install the program in a computer from the recording medium, or receive the program via a network such as a LAN (local area network) and the Internet and install the program in a recording medium such as incorporated hard disk.

It should be noted that the various processes described in the specification may be performed in chronological order on the basis of the description or may be performed in parallel or individually in accordance with a processing ability of the apparatus that performs the processes or when necessary. Further, in the specification, the system refers to a logically complex structure of a plurality of apparatuses, and thus the apparatuses of the structure are not limited to be in the same casing.

As described above, according to the embodiment of the present disclosure, the apparatus and the method which perform activation control of the electronic apparatus for achieving power saving and improving the user's convenience are attained.

Specifically, the network apparatus that is network-connected and the network apparatus activation device that outputs the activation instruction to the network apparatus are provided. The network apparatus activation device includes the communication unit that performs communication via the network and the data processing unit that outputs the activation instruction to the network. The data processing unit recognizes the state transition from the non-active state to the active state of the network apparatus activation device and outputs the activation instruction to the network apparatus on the basis of the recognition of the state transition. In response to the reception of the activation instruction, the network apparatus performs the transition process from the standby state in which the reception detection of the activation instruction is performed to the activation state in which the apparatus main operation can be performed.

With this structure, the apparatus and the method that perform the activation control for the electronic apparatus for achieving the power saving and improving the user's convenience are attained.

The invention claimed is:

1. An electronic apparatus activation control apparatus, comprising:
   a communication unit configured to perform communication via a network; and
   a data processing unit configured to output an activation instruction to a plurality of network apparatuses connected to the network through the communication unit, the data processing unit recognizing a state transition from a non-active state to an active state of the electronic apparatus activation control apparatus and outputting the activation instruction to one of the plurality network apparatuses on the basis of recognition of the state transition, and
   wherein in the state transition from the non-active state to the active state, the data processing unit makes a determination whether the state transition was caused by one of a first user apparatus or a second user apparatus and selects a first one of the plurality of network apparatuses to output the activation instruction if the state transition was caused by the first user apparatus and a second one of the plurality of network apparatuses, different than the first one, to output the activation instruction if the state transition was caused by the second user apparatus.

2. The electronic apparatus activation control apparatus according to claim 1, wherein the data processing unit is further configured to, after outputting the activation instruction for receipt by the network apparatus:
   (i) cause the electronic apparatus activation control apparatus to enter a standby state for a time period,
   (ii) after the time period has elapsed, determine whether or not the electronic apparatus activation control apparatus is maintained in the active state or is in the non-active state, and
   (iii) output the activation instruction until a determination result therefrom indicates that the electronic apparatus activation control apparatus has shifted from the active state to the non-active state.

3. The electronic apparatus activation control apparatus according to claim 1, wherein the state transition from the non-active state to the active state shifts the network apparatus to an activation state.

4. The electronic apparatus activation control apparatus according to claim 1, wherein the data processing unit periodically performs a state detection of the electronic apparatus activation control apparatus, and in the case where the electronic apparatus activation control apparatus is in the active state, periodically outputs the activation instruction to the network apparatus.

5. The electronic apparatus activation control apparatus according to claim 1, wherein the data processing unit periodically performs a state detection of the electronic apparatus activation control apparatus, and when recognizing that the electronic apparatus activation control apparatus shifts from the active state to the non-active state, stops outputting of the activation instruction to the network apparatus.

6. The electronic apparatus activation control apparatus according to claim 1, wherein the data processing unit outputs the activation instruction for activating only the network apparatus selected.

7. The electronic apparatus activation control apparatus according to claim 1, wherein the state transition from the non-active state to the active state is triggered by detection of a registered terminal in a communications area of the electronic apparatus activation control apparatus.

8. The electronic apparatus activation control apparatus according to claim 1, wherein the electronic apparatus activation control apparatus is an illumination switch, and wherein the data processing unit recognizes an operation of turning on the illumination switch by a user as the state transition from the non-active state to the active state of the electronic apparatus activation control apparatus and outputs the activation instruction to the network apparatus on the basis of the recognition of the state transition.

9. The electronic apparatus activation control apparatus according to claim 1, the electronic apparatus activation control apparatus being an illumination switch, wherein the data processing unit recognizes an operation of turning off the illumination switch by a user as the state transition from the active state to the non-active state of the electronic apparatus activation control apparatus and stops outputting of the activation instruction to the network apparatus on the basis of the recognition of the state transition.

10. The electronic apparatus activation control apparatus according to claim 1, wherein the data processing unit makes the determination whether the state transition was caused by one of the apparatus and the user comprises the data processing unit makes the determination based on terminal identifier associated with a given user terminal, and selects which of the plurality of network apparatuses to output the activation instruction based on the given user terminal identified as causing the state transition.

11. An electronic apparatus activation control system, comprising:
- a plurality of network apparatuses connected to a network; and
- a network apparatus activation device configured to output an activation instruction to one or more of the plurality of network apparatuses via the network, the network apparatus activation device including a communication unit configured to perform communication via the network and a data processing unit configured to output the activation instruction to the network apparatus connected to the network through the communication unit, the data processing unit recognizing a state transition from a non-active state to an active state of the network apparatus activation device and outputting the activation instruction to one of the plurality of network apparatuses on the basis of recognition of the state transition, and
- wherein in the state transition from the non-active state to the active state, the data processing unit makes a determination whether the state transition was caused by one of first user apparatus or a second user apparatus and selects a first one of the plurality of network apparatuses to output the activation instruction if the state transition was caused by the first user apparatus and a second one of the plurality of network apparatuses, different than the first one, to output the activation instruction if the state transition was caused by the second user apparatus.

12. The electronic apparatus activation control system according to claim 11, wherein the network apparatus activation device is further configured to, after outputting the activation instruction for receipt by the network apparatus:
(i) cause the electronic apparatus activation control apparatus to enter a standby state for a time period,
(ii) after the time period has elapsed, determine whether or not the electronic apparatus activation control apparatus is maintained in the active state or is in the non-active state, and
(iii) output the activation instruction until a determination result therefrom indicates that the electronic apparatus activation control apparatus has shifted from the active state to the non-active state.

13. The electronic apparatus activation control system according to claim 11, wherein in response to reception of the activation instruction from the network apparatus activation device, the network apparatus performs a transition process from a standby state in which a reception detection of the activation instruction is possible to an activation state in which an apparatus main operation is possible.

14. The electronic apparatus activation control system according to claim 13, wherein the network apparatus periodically detects the reception of the activation instruction from the network apparatus activation device, and when the reception detection of the activation instruction is stopped in the periodical detection process, performs the transition process from the activation state to the standby state.

15. An electronic apparatus activation control method performed by an electronic apparatus activation control apparatus including
- a communication unit configured to perform communication via a network, and
- a data processing unit configured to output an activation instruction to a network apparatus of plurality of network apparatuses connected to the network through the communication unit, the data processing unit recognizing a state transition from a non-active state to an active state of the electronic apparatus activation control apparatus and outputting the activation instruction to the network apparatus on the basis of recognition of the state transition, and
- wherein in the state transition from the non-active state to the active state, the data processing unit makes a determination whether one of a first user apparatus or a second user apparatus caused the state transition and selects a first one of the plurality of network apparatuses to output the activation instruction if the state transition was caused by the first user apparatus and a second one of the plurality of network apparatuses, different than the first one, to output the activation instruction if the state transition was caused by the second user apparatus.

16. A program causing an electronic apparatus activation control apparatus to execute an electronic apparatus activation control process,
- the electronic apparatus activation control apparatus including:
- a communication unit configured to perform communication via a network, and
- a data processing unit configured to output an activation instruction to a network apparatus of plurality of network apparatuses connected to the network through the communication unit,
- the program causing the data processing unit to recognize a state transition from a non-active state to an active state of the electronic apparatus activation control apparatus and output the activation instruction to the network apparatus on the basis of recognition of the state transition, and
- wherein in the state transition from the non-active state to the active state, the data processing unit makes a determination whether one of first user apparatus or a second user apparatus caused the state transition and selects a first one of the plurality of network apparatuses to output the activation instruction if the state transition was caused by the first user apparatus and a second one of the plurality of network apparatuses, different than the first one, to output the activation instruction if the state transition was caused by the second user apparatus.

* * * * *